(12) United States Patent
Unger

(10) Patent No.: US 9,718,323 B2
(45) Date of Patent: Aug. 1, 2017

(54) METHOD FOR OPERATING A WHEEL SUSPENSION SYSTEM

(71) Applicant: AUDI AG, Ingolstadt (DE)

(72) Inventor: Andreas Unger, Gaimersheim (DE)

(73) Assignee: AUDI AG, Ingolstadt (DE)

(*) Notice: Subject to any disclaimer, the term of this patent is extended or adjusted under 35 U.S.C. 154(b) by 0 days.

(21) Appl. No.: 15/317,343

(22) PCT Filed: Jun. 5, 2015

(86) PCT No.: PCT/EP2015/001144
§ 371 (c)(1),
(2) Date: Dec. 8, 2016

(87) PCT Pub. No.: WO2015/188926
PCT Pub. Date: Dec. 17, 2015

(65) Prior Publication Data
US 2017/0113508 A1    Apr. 27, 2017

(30) Foreign Application Priority Data
Jun. 13, 2014  (DE) .......... 10 2014 008 675

(51) Int. Cl.
*B60G 17/0165*   (2006.01)
*B60G 17/06*    (2006.01)

(52) U.S. Cl.
CPC ......... *B60G 17/0165* (2013.01); *B60G 17/06* (2013.01); *B60G 2202/322* (2013.01);
(Continued)

(58) Field of Classification Search
CPC .......... B60G 17/0165; B60G 2202/322; B60G 2400/821; B60G 2400/823; B60G 2300/60
See application file for complete search history.

(56) References Cited

U.S. PATENT DOCUMENTS

| | | | | |
|---|---|---|---|---|
| 4,634,142 A | * | 1/1987 | Woods | B60G 17/0155 188/282.2 |
| 5,061,932 A | * | 10/1991 | Tribe | B60G 17/019 342/70 |

(Continued)

FOREIGN PATENT DOCUMENTS

| | | |
|---|---|---|
| DE | 102009 036 731 A1 | 4/2010 |
| DE | 101 20 918 B4 | 5/2011 |

(Continued)

OTHER PUBLICATIONS

English International Search Report issued by the European Patent Office in International Application PCT/EP2015/001144.

*Primary Examiner* — James A English
(74) *Attorney, Agent, or Firm* — Henry M. Feiereisen LLC

(57) ABSTRACT

In a method for operating a wheel suspension system of a motor vehicle, a sensor checks the ground for the presence of an obstacle, as identified by a control device, and predicts for the obstacle a first value for an amount of electrical energy, which is to be converted from mechanical energy by an electrical machine, when a damping ratio is set with a defined recuperation value for a damper connecting a wheel to a chassis. The control device predicts a second value for a ride comfort and determines a third value for a decision criterion, which is a function of the first and second values. The identified obstacle is to be driven over with the recuperation value set for the damping ratio of the damper, when the value for the decision criterion corresponds to a target value.

13 Claims, 1 Drawing Sheet

(52) U.S. Cl.
CPC ...... *B60G 2202/42* (2013.01); *B60G 2300/60* (2013.01); *B60G 2400/821* (2013.01); *B60G 2400/823* (2013.01); *B60G 2600/02* (2013.01)

(56) References Cited

U.S. PATENT DOCUMENTS

| | | | |
|---|---|---|---|
| 6,111,375 A * | 8/2000 | Zenobi | B60G 13/14 |
| | | | 180/65.1 |
| 8,840,118 B1 | 9/2014 | Giovanardi | |
| 9,533,539 B2 * | 1/2017 | Eng | B60G 17/019 |
| 9,597,940 B2 * | 3/2017 | Anderson | B60G 17/016 |
| 2004/0075236 A1 * | 4/2004 | Radamis | B60G 13/14 |
| | | | 280/124.158 |
| 2004/0128040 A1 | 7/2004 | Stiller | |
| 2009/0079145 A1 | 3/2009 | Inoue | |
| 2009/0260935 A1 | 10/2009 | Avadhany | |
| 2011/0115222 A1 * | 5/2011 | Parker | H02N 2/181 |
| | | | 290/7 |
| 2013/0154280 A1 * | 6/2013 | Tucker | F01C 1/103 |
| | | | 290/1 R |
| 2013/0158799 A1 | 6/2013 | Kamimura | |
| 2016/0263959 A1 * | 9/2016 | Gohrle | B60G 17/0165 |
| 2017/0036504 A1 * | 2/2017 | Schindler | B60G 13/14 |

FOREIGN PATENT DOCUMENTS

| | | |
|---|---|---|
| DE | 10 2010052 964 A1 | 5/2012 |
| WO | WO2011/159874 A2 | 12/2011 |

\* cited by examiner

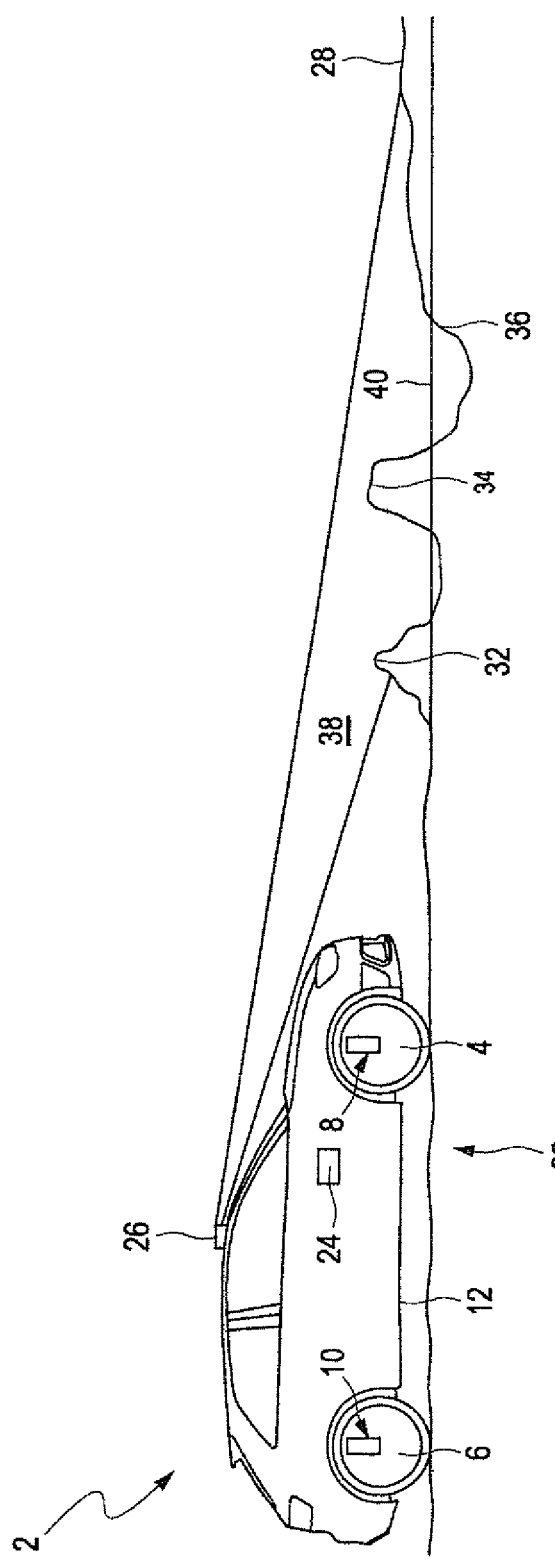
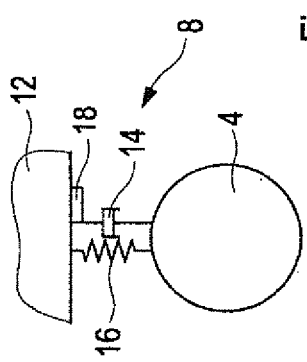

METHOD FOR OPERATING A WHEEL SUSPENSION SYSTEM

CROSS-REFERENCES TO RELATED APPLICATIONS

This application is the U.S. National Stage of International Application No. PCT/EP2015/001144, filed Jun. 5, 2015, which designated the United States and has been published as International Publication No. WO 2015/188926 and which claims the priority of German Patent Application, Serial No. 10 2014 008 675.5, filed Jun. 13, 2014, pursuant to 35 U.S.C. 119(a)-(d).

BACKGROUND OF THE INVENTION

The invention relates to a method for operating a wheel suspension system of a motor vehicle as well as to a system for operating a wheel suspension system of a motor vehicle.

If a motor vehicle travels over an uneven path, energy is usually dissipated via the dampers of a chassis of the motor vehicle. However, it is possible to recuperate and thus recover energy via appropriate damper designs.

The power of the damper is first considered for calculating the energy to be recuperated. The power is a product of a force and a speed of the damper. Integrating the power over time results in the energy. If the energy to be recuperated is to be as high as possible in a uniform time interval, either the force or the speed of the damper must be high, wherein however only the force of the damper can be directly influenced.

A method for operating a motor vehicle is known from the printed document DE 10 2009 036 731 A1. Described therein is that electrical energy, which is recuperated via a damping of a wheel, is subject to great fluctuations and high peak values. Therefore, an actuator with a power electronics and a short-term memory is provided for each wheel of the motor vehicle, so as to be able to convert relative movements of the wheel into electrical energy based on road irregularities.

An electrically adjustable control for a damper is known from the printed document DE 101 20 918 B4. In this case, a position of the damper is adapted to the specific driving situation for maximum possible comfort, wherein the specific driving situation is determined, for example, from sensors which detect road unevenness.

The printed document DE 10 2010 052 964 A1 shows a method for operating a propulsion and/or braking system of a motor vehicle, wherein with this propulsion and/or braking system, energy is recuperated via an energy storage device inside the vehicle as a function of a detection device, which detects objects in an environment of the motor vehicle.

Furthermore, recuperating damper systems are known from the printed documents U.S. 2009/0260935 A1 and WO 2011/159874 A2.

A system for generating a damping force as part of a wheel suspension system of a motor vehicle is known from the printed document U.S. 2009/0079145 A1. The system includes hereby a first device which has an electromagnetic motor and is designed to generate a first damping force. In addition, the system includes a second device for generating a second damping force which depends on an action of a liquid when a speed of a lifting movement matches a speed by which an electrically driving force which is generated by the electromagnetic motor exceeds a voltage of a voltage source.

A damping device for a motor vehicle is known from the printed document U.S. 2013/0158799 A1. This motor vehicle is hereby equipped with a forecast sensor which is designed to detect a convex area on a roadway before it is driven over by a wheel of the motor vehicle. When the convex portion is driven over, a stiffness of the damping device, for example, a spring, is adapted to the convex portion, whereby ride comfort is to be enhanced.

U.S. Pat. No. 8,840,118 B1 describes an active suspension system that has a hydraulic actuator, a hydraulic motor pump, an electric motor that is coupled to the hydraulic motor pump, a sensor for ascertaining a state of a wheel, and a control device for controlling the preceding components. The electric motor converts hereby electric energy only when the hydraulic actuator is actively moved.

SUMMARY OF THE INVENTION

Against this background, a method and a system with the features of the independent patent claims are presented. Embodiments of the method and the system become apparent from the respective dependent patent claims.

The method according to the invention is provided for operating a wheel suspension system of a motor vehicle, including a damper via which a wheel of the motor vehicle is connected to a chassis of the motor vehicle and an electrical machine associated with the damper. In the method, a ground to be traveled in the future by the motor vehicle is ascertained with at least one sensor for the anticipatory determination of an environment of the motor vehicle, wherein the ground to be traveled in the future is examined for the presence of obstacles, wherein an unevenness of the ground is identified as an obstacle, when a value of at least one measurement of the unevenness deviates by a tolerance value from a threshold value. In addition, for the identified obstacle, a value for an amount of electrical energy is predicted or determined in advance, which energy is converted from mechanical energy by the electrical machine operated as a generator, when a damping ratio is adjusted with a specified, determined recuperation value for the damper while traveling the identified obstacle. For the identified obstacle, a value for a ride comfort is further predicted or determined in advance, which value is established, when the damping ratio is adjusted with the recuperation value for the damper, when traveling the identified obstacle in the future. Furthermore, a value for a decision criterion is determined, which value is dependent on one hand as a function of the value for the amount of electrical energy converted from mechanical energy and, on the other hand, is dependent on the value for ride comfort at the recuperation value adjusted for the damping ratio of the damper. The identified obstacle is then only driven over or traveled with the recuperation value adjusted for the damping ratio of the damper, when the value for the decision criterion has a target value provided for this purpose.

Two values may hereby be possible for the decision criterion, for example. These two values can be defined either as 0 and 1 in the embodiment, for example, like state values, wherein 1 corresponds to the target value, whereas 0 does not correspond to the target value or a negative target value. In the presence of a first value, for example, 1, which corresponds to the provided target value, the recuperation value is set, when driving over the obstacle and the electrical machine is operated as a generator. In the presence of a second possible value, e.g., 0, for the decision criterion, this measure is to be omitted.

The damper is adjusted harder for the damping ratio with set recuperation value than when driving over a level ground, for which a comfort value is usually set and/or provided for the damping ratio, with the recuperation value being greater than the comfort value.

After traveling over the obstacle, the damping ratio is reduced again from the recuperation value to the comfort value.

A mechanical power of the damper is predicted or determined in advance from a square of a speed of the damper multiplied by the recuperation value for the damping ratio. The value for the amount of electrical energy to be recovered or recuperated is determined through integration of the power over the time during which the obstacle is to be traveled.

In an embodiment of the method, a region of the ground to be traveled in the future is ascertained with the sensor, and a reference plane is defined, whose level corresponds to a mean value of point heights along the at least one region.

Furthermore, a deviation of the unevenness from the level of the reference plane is determined as the at least one measurement for the unevenness. This at least one deviation can also be defined as a deviation in the vertical direction. By defining the reference plane, it is possible to consider whether an incline or a decline is traveled with the motor vehicle. A direction of the at least one deviation is usually oriented parallel to a normal force with which the motor vehicle acts on the ground.

In addition, a change in the deviation of the unevenness from the level of the reference plane in a direction parallel to the reference plane can be determined as the at least one measurement for unevenness. Such a change in the deviation can also be referred to as a gradient of the deviation and can usually be defined as the anticipated direction provided in the direction of travel of the motor vehicle.

Alternatively or additionally, a length of the unevenness in one direction is determined as the at least one measurement for the unevenness, for example of the travel direction which is parallel to the reference plane.

In addition, it is also possible that a frequency of a periodically repeating form of the unevenness is determined as the at least one measurement for the unevenness in a direction or the travel direction which is parallel to the reference plane.

A chassis frame of the motor vehicle includes all wheel suspension systems of the motor vehicle, wherein each one wheel is connected to the chassis with a wheel suspension system provided for this wheel. A wheel suspension system includes, i.a., a spring and a wheel suspension, in addition to the damper, which is usually designed as a vibration damper. An active chassis frame may have a control device for actively controlling a function of a respective wheel suspension system.

In one embodiment of the method, the value for the amount of energy that can be recovered when driving over the obstacle is predicted based on at least one simulation model that is used for the wheel suspension system. With this at least one simulation model, the behavior of the obstacle to be traveled in the future is predicted for the wheel suspension system, when the recuperation value provided for the damping ratio of the damper is set.

To quantify the values or measures for ride comfort, the amount of predicted energy, which indicates a recuperation potential, and the decision criterion are simulated in a configuration as simulation models, two so-called simulated quarter vehicle models, which travel over the detected unevenness at an adjustable distance in front of the real motor vehicle. Provision is hereby made for a quarter vehicle model, associated with the wheel suspension system, as a simulation model for each wheel suspension system, via which a wheel is connected to the chassis. Thus, a future behavior of the respective wheel suspension system is to be individually simulated, when driving over the ground in the future with the wheel for the respective wheel suspension system. On the basis of such a simulation with the simulation model or quarter vehicle model, the amount of electrical energy to be recuperated by the respective wheel suspension system during future traveling of the ground is also predicted.

A first simulation model provided hereby has a low damping, wherein a simulated build-up acceleration is used as a value for ride comfort. In this case, a low value represents a high ride comfort, so that a reciprocal value can be used. In contrast, a second simulation model has a high damping, wherein the value for the amount of predicted energy for the recuperation potential is estimated based on a product of the damping ratio for a damping force and a relative speed between the chassis or a structure of the motor vehicle and the respective wheel. A high value represents a high recuperation potential.

In both cases, a determination of an effective value for ride comfort arises in a sliding window, wherein the width of the window is calculated in seconds via the speed of the motor vehicle and a selected forecast length for the ground to be traveled. A standardization of effective values can be carried out beforehand in the simulation with the two simulation models, by executing an estimation for a favorable or unfavorable case with selected unevennesses.

The system according to the invention is designed for operating a described wheel suspension system and includes, as components, the at least one sensor for measuring an environment of the motor vehicle and a control device. An embodiment of the method described above is to be implemented with the components of the system. In this case, values of the amount of energy that can be recuperated and for the ride comfort, for example, are to be determined by estimation and/or calculation by the control device. In addition, a condition for the decision criterion must be checked with the control device and the recuperation value is to be set for the damper when driving over the identified obstacle, when the decision criterion has the target value.

The at least one sensor is arranged on an outer wall of the motor vehicle, wherein a measurement region of the at least one sensor is oriented or is to be orientated in the direction of travel of the motor vehicle.

Moreover, the at least one sensor is designed to detect the environment of the motor vehicle on the basis of electromagnetic or acoustic waves, which are emitted by the at least one sensor, to be reflected from at least one object in the environment of the motor vehicle, and are received again by the at least one sensor. Accordingly, the at least one sensor can be designed as a camera, radar sensor, lidar sensor or as an ultrasonic sensor.

With a forecast or preview sensor system which includes the at least one sensor, for example, a camera, a height profile of a surface of the ground to be traveled by the motor vehicle, usually a road, can be determined and from a form, normally the at least one measurement of the obstacle along the surface, inference can be made whether a potential for a recuperation for the obstacle is high. In this case, a recuperation can be executed deliberately only for large obstacles, for which a loss of comfort based on a high energy recovery is justified.

When only a small amount of energy is to be recuperated based on the height profile of the surface, measures for energy recovery are not initiated at all, so that the ride comfort is not adversely affected. In this way, a clear decision can be made with regard to a determination of whether an energy recovery is to be carried out for an obstacle to be driven over or a high ride comfort is to be preferred.

In one embodiment of the method, the height profile of the ground, detected by the forecast sensor system, is examined for unevennesses which are very favorable for energy recovery. For example, unevennesses can be deliberately selected, whose deviation or amplitude has at least a threshold value of x cm, e.g. 2 cm. Alternatively or additionally, a frequency analysis can be performed for a section of the height profile of the surface, so that unevennesses are to be selected in a special range of a frequency for describing the height profile, e.g., from 1 Hz to 4 Hz. This is possible, for example, for a ground whose height profile has a periodically repeating shape along a path, wherein the frequency can be derived from a period of the repeating form and, optionally, by considering a speed of the motor vehicle. Thus, i.a., cobblestone pavement as a possible ground has such a periodically repeating form.

A further possibility for implementing the method resides in searching gradients along the height profile which describe a change in a contour of the height profile and whose values deviate respectively by at least one tolerance value from a threshold value because a high speed is to be expected there for a damper.

The criteria mentioned to be considered in the context of the method can be combined in any way, wherein suitable unevennesses can be selected along the height profile and identified as obstacles if necessary. Shortly before an identified obstacle impacts the advancing wheels configured as front wheels, the damping ratio of a damper associated with the respective wheel is raised to an applicable value, e.g., a maximum value for a best possible energy recovery, by providing the recuperation value. Shortly after the wheels, which are configured as rear wheels, have passed or traveled over the selected unevenness, the damping is lowered again to a normal value.

Overall, with the introduced method and the introduced system for a motor vehicle which has a recuperative chassis, advance analysis of the height profile of the ground to be traveled allows evaluation whether a recuperation can be carried out along the ground or whether to forgo this in order to maintain high ride comfort.

In order to convert as much mechanical energy into electrical energy as possible during recuperation, the dampers are set extremely hard with the recuperation value for large obstacles. This can, however, lead to great loss of comfort. In the case of small obstacles, such as a manhole cover or a patchwork made of tar, significantly less electrical energy can be produced via the recuperation, but a loss of comfort is still also high. Only by a soft damping can a high ride comfort be achieved, although the potential for the recuperation decreases again. The introduced method is used to determine whether or not a recuperation should be executed for an obstacle. Thus, it is not necessary to forgo a high recuperation in favor of the comfort or to adjust the chassis of the motor vehicle uncomfortably, when energy recovery is to be the main focus.

Further advantages and embodiments of the invention will become apparent from the description and the accompanying drawing.

It is to be understood that the features mentioned above and those which are still to be explained below can be used not only in the respective specified combination but also in other combinations or taken alone, without departing from the scope of the present invention.

BRIEF DESCRIPTION OF THE DRAWING

Embodiments of the invention are schematically illustrated in the drawing and described schematically and in detail with reference to the drawing.

FIG. 1 shows a schematic illustration of a motor vehicle which is equipped with an embodiment of the system according to the invention and which travels a ground, wherein an embodiment of the method according to the invention is carried out.

FIG. 2 shows a schematic illustration of a detail of the embodiment of the system from FIG. 1.

DETAILED DESCRIPTION OF PREFERRED EMBODIMENTS

The motor vehicle 2 shown in FIG. 1 includes four wheels 4, 6, of which, however, only a first wheel 4, configured as a front wheel, and a second wheel 6, configured as a rear wheel, are shown. Each wheel 4, 6 is connected via one wheel suspension system 8, 10 to a chassis 12 of the motor vehicle 2.

A detail of the wheel suspension system 8 of the first wheel 4 is shown in FIG. 2. Provision is hereby made for all wheel suspension systems 8, 10 of all the wheels 4, 6 to have the same components. Thus, each wheel suspension system 8 includes, as a first component, a damper 14 and a spring 16. As an additional component of the respective wheel suspension system 8, an electrical machine 18 is associated with the damper 14 as an actuator. The electrical machine 18 can be used either as a motor, wherein electrical energy is to be converted into mechanical energy, or as a generator, wherein mechanical energy is to be converted into electrical energy and thus recuperated.

When the electrical machine 18 is operated as a motor or motor-driven, the damper 14 associated with the electrical machine 18 is to be mechanically acted upon by the electrical machine 18 and thus to be excited. Conversely, when the electrical machine 18 is operated as a generator, it is mechanically acted upon by a movement of the associated damper 14, so that mechanical energy, which is generated by the damper 14 during its movement, is converted by the electrical machine 18 into electric energy in a generator-driven operation.

in this context, a damping ratio of the damper 14 is also to be varied, with the damper 14 being adjusted increasingly harder, as the damping ratio increases. When the damping ratio is greater than a threshold value to be defined beforehand and thus has a recuperation value and the electrical machine 18 operated as a generator is acted upon by the thus set hard damper 14, mechanical energy of the damper 14 is converted into electric energy by the electrical machine 18.

The introduced embodiment of the system 22 includes a control device 24 with which at least one step of an embodiment of a method according to the invention is to be controlled and thus controlled via an open loop control and/or closed loop control, and at least one sensor 26 for ascertaining and thus for recognizing and/or locating an environment of the motor vehicle 2, with this sensor 26 being arranged here on an outer wall of the motor vehicle 2. In this case, the environment is detected without contact by the sensor 26 on the basis of electromagnetic or acoustic waves which are emitted by the sensor 26, reflected by objects in the environment and are received by the sensor 26. Such a sensor can be designed as a camera for electromagnetic waves in the visible region, but also as a radar or lidar sensor. A sensor 26, which detects the environment on the basis of acoustic waves is generally designed as an ultrasonic sensor.

All wheel suspension systems 8, 10 of all wheels 4, 6 and thus all dampers 14, springs 16 and electrical machines 18 are each, depending to the definition, configured as components of the embodiment of the system 22 according to the invention introduced here.

All the introduced components of the embodiment of the system 22 can also be used for carrying out other functions of the motor vehicle 2, independent of the intended embodiment of the method.

Furthermore, it is provided here that the motor vehicle 2, in a situation illustrated with reference to FIG. 1, travels a ground 28 with a height profile which has several unevennesses. Three of these unevennesses are also defined or designated as obstacles 32, 34, 36 based on their respective measurements and/or size. In the situation described here, the motor vehicle 2 approaches the unevennesses, classified here as obstacles 32, 34, 36, along the height profile of the ground 28.

When carrying out the embodiment of the method, the environment and thus, i.a., the ground 28 is ascertained within a detection range 38 of the sensor 26, wherein the detection region 38 is oriented forwardly in an anticipatory manner in travel direction of the motor vehicle 2.

Moreover, the height profile of the ground 28 is analyzed by the control device 24, wherein unevennesses are also recognized and/or identified and, in the present situation, categorized or classified as obstacles 32, 34, 36 which are relevant in the embodiment of the method. For this purpose, the height profile of the ground 28 is measured, with local changes of a contour of points on a surface of the ground 28 being determined to provide the height profile. In the introduced embodiment, a reference plane 40 which is arranged parallel to the chassis 12 of the motor vehicle 2, for example, is hereby defined for at least one region of the ground 28, and, alternatively or additionally, can correspond with reference to its height to a mean value of point heights along the at least one region.

A possible unevenness of the height profile of the ground 28 is recognized and/or classified as an obstacle 32, 34, 36, when the contour of the height profile of the ground 28 in a direction changes, e.g., in a desired travel direction of the motor vehicle 2, relative to the reference plane 40 at a location of the ground by a value which is at least as great as a threshold value to be defined for this purpose. In this case, the contour of the height profile with respect to a straight line can be defined as an abscissa, which is oriented according to the direction provided and runs through the reference plane 40, as a curve which is to be plotted along an ordinate which is perpendicular to the straight line or abscissa, wherein a first derivative of this curve corresponds to a change in the course. A value of the derivative and thus the value of the change is compared to the threshold value to be defined for this purpose. In the present embodiment, a first and a second obstacle 32, 34 are classified as elevations and a third obstacle 36 as a depression.

Furthermore, with the control device 24, it is to be determined for each obstacle 32, 34, 36 how much energy can be recovered by the electrical machine 18 associated with the respective damper 4 at a certain recuperation value for the damping ratio which is set for the damper 14 during an operation of the electrical machine 18 as a generator. In this case, a value of an amount of energy which may be recovered is dependent on the measurement of the respective obstacle 32, 34, 36 as well as on the damping ratio to be set, when a wheel 4 drives over and/or passes the obstacle 32, 34, 36. Moreover, a value for a ride comfort of the motor vehicle is to be determined, which value is established, when the obstacle 32, 34, 36 is driven over by the wheel 4 with increased recuperation value set for the damping ratio, wherein the value for the ride comfort also depends on the measurement of the obstacle 32, 34, 36 as well as the recuperation value for the damping ratio. A decision can be made based on a value of a decision criterion to be calculated as to whether the obstacle 32, 34, 36 can be driven over with the increased damping ratio and thus electric energy recovered by the electrical machine 18, wherein the value of the decision criterion depends, on one hand, on the value of the ride comfort and, on the other hand, on the value of the electrical energy which can be recovered, when the obstacle 32, 34, 36 is driven over. Normally, the lower the ride comfort, the higher the damping ratio and/or the amount of electrical energy to be recovered, Conversely, the higher the ride comfort, the lower the damping ratio and/or the amount of electrical energy to be recovered.

Depending on the definition of the decision criterion, an obstacle 32, 34, 36 can be driven over with an increased value and thus the recuperation value for the damping ratio of the damper 14, when the value of the decision criterion corresponds to a target value to be defined for this purpose. In this case, the target value for the decision criterion can be set individually by a person driving the motor vehicle 2. By providing the decision criterion with consideration of the individually adjustable target value for this purpose, there is thus a balance between the ride comfort on one hand and the amount of electrical energy to be recovered on the other hand.

The invention claimed is:

1. A method for operating a wheel suspension system of a motor vehicle, comprising:
   ascertaining by a sensor a ground to be traveled in the future by the motor vehicle;
   checking the ground for the presence of an obstacle;
   identifying an unevenness as the presence of the obstacle, when a value of at least one measurement of the unevenness deviates by a tolerance value from a threshold value;
   predicting for the identified obstacle a first value for an amount of electrical energy which is converted from mechanical energy by an electrical machine of the motor vehicle operated as a generator, when a damping ratio is set with a defined recuperation value for a damper via which a wheel is connected to a chassis of the motor vehicle, as the motor vehicle drives over the identified obstacle;
   predicting a second value for a ride comfort by setting the damping ratio with the recuperation value for the damper, as the motor vehicle drives over the identified obstacle;
   determining a third value for a decision criterion as a function of the first value and of the second value; and
   driving over the identified obstacle with the recuperation value set for the damping ratio of the damper, when the third value corresponds to a target value.

2. The method of claim 1, further comprising adjusting the damper at set recuperation value for the damping ratio harder than when traveling a level ground in which a comfort value is set for the damping ratio.

3. The method of claim 2, further comprising reducing the damping ratio from the recuperation value to the comfort value after driving over the obstacle.

4. The method of claim 1, further comprising:
predicting a mechanical power of the damper from a square of a speed of the damper multiplied by the recuperation value for the damping ratio; and
determining the first value through integration of the mechanical power over the time during which the obstacle is to be traveled.

5. The method of claim 1, further comprising:
ascertaining by the sensor a region of the ground to be traveled in the future; and
defining a reference plane having a level which corresponds to a mean value of point heights along the region.

6. The method of claim 5, wherein a deviation of the unevenness from the level of the reference plane is determined as the at least one measurement of the unevenness.

7. The method of claim 5, wherein a change of a deviation of the unevenness from the level of the reference plane in a direction that is parallel to the reference plane is determined as the at least one measurement of the unevenness.

8. The method of claim 5, wherein a length of the unevenness in a direction that is parallel to the reference plane is determined as the at least one measurement of the unevenness.

9. The method of claim 5, wherein a frequency of a periodically repeating shape of the unevenness in a direction that is parallel to the reference plane is determined as the at least one measurement of the unevenness.

10. The method of claim 1, further comprising using at least one simulation model for the wheel suspension system for predicting the first value of the amount of convertible electrical energy, when traveling the ground.

11. A system for operating a wheel suspension system of a motor vehicle, comprising:
a control device configured to check a ground to be traveled in the future by the motor vehicle for the presence of an unevenness of the ground and to identify the unevenness as an obstacle, when a value of at least one measurement of the unevenness deviates by a tolerance value from a threshold value; and
a sensor,
said control device configured
to predict a value for a ride comfort for the identified obstacle, which is established when the damping ratio is set with the recuperation value for the damper when traveling the identified obstacle,
to determine a value for a decision criterion, which is a function of the value for the amount of electrical energy converted from mechanical energy and of the value for ride comfort with the recuperation value set for the damping ratio of the damper, and
to cause the identified obstacle to be driven over with the recuperation value set for the damping ratio of the damper, when the value for the decision criterion corresponds to a target value.

12. The system of claim 11, wherein the sensor is arranged on an outer wall of the motor vehicle and has a detection region which is oriented in a travel direction of the motor vehicle.

13. The system of claim 11, wherein the sensor is configured to ascertain an environment of the motor vehicle based on waves that are to be emitted by the sensor, to be reflected from at least one object in the environment of the motor vehicle, and to be received again by the sensor.

* * * * *